United States Patent
Nelson et al.

(10) Patent No.: US 11,481,254 B2
(45) Date of Patent: Oct. 25, 2022

(54) PAYROLL DATA PROCESSING SERVER

(71) Applicant: ADP, Inc., Roseland, NJ (US)

(72) Inventors: Craig Nelson, Parsippany, NJ (US); Lakshmi Swetha Bedadala, Alpharetta, GA (US); Theodore Donald, Alpharetta, GA (US); Hong Wang, Alpharetta, GA (US); Uthayakumar Narayanasamy, Alpharetta, GA (US); Frederick Platten, Alpharetta, GA (US); Girija Thilak, Alpharetta, GA (US); Rajasekhar Dara, Alpharetta, GA (US); Adithya Parvatam, Alpharetta, GA (US); Anuradha Verma, Alpharetta, GA (US); Ananth Sudini, Alpharetta, GA (US)

(73) Assignee: ADP, Inc., Roseland, NJ (US)

(*) Notice: Subject to any disclaimer, the term of this patent is extended or adjusted under 35 U.S.C. 154(b) by 144 days.

(21) Appl. No.: 17/120,992

(22) Filed: Dec. 14, 2020

(65) Prior Publication Data

US 2022/0188160 A1 Jun. 16, 2022

(51) Int. Cl.
*G06F 9/48* (2006.01)
*G06F 9/50* (2006.01)
*G06F 9/455* (2018.01)

(52) U.S. Cl.
CPC ............ *G06F 9/50* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/5005* (2013.01); *G06F 9/5011* (2013.01); *G06F 9/5016* (2013.01);
(Continued)

(58) Field of Classification Search
CPC .. G06F 9/455; G06F 9/45533; G06F 9/45558; G06F 2009/45562; G06F 2009/4557; G06F 2009/45575; G06F 9/48; G06F 9/4806; G06F 9/4843; G06F 9/485; G06F 9/4881; G06F 9/50; G06F 9/5005; G06F 9/05211; G06F 9/5016; G06F 9/5022; G06F 9/5027; G06F 9/5061; G06F 9/5077
See application file for complete search history.

(56) References Cited

U.S. PATENT DOCUMENTS

2018/0143856 A1* 5/2018 Du .................... G06F 9/4881
2018/0300653 A1* 10/2018 Srinivasan ............ H04L 67/06
(Continued)

*Primary Examiner* — Charles M Swift
(74) *Attorney, Agent, or Firm* — Yee & Associates, P.C.

(57) ABSTRACT

Managing batched jobs is provided. The method comprises receiving a job batch request from a client for a number of processing jobs. Each job is registered, and jobs that are ready for execution at a specified time are collected. For each collected job an instance of the job is locked to prevent duplicate execution. The locked jobs are queued, and a container is created for each job in the queue. A method of execution is determined for each job in the queue, and each job is then executed according the method determined for that job. Job events for each executing job are logged, a determination if a job was completed successfully is made according to its respective job events. A job status is updated for each completed job. The container of each completed job is then destroyed, and each completed job is unlocked.

30 Claims, 7 Drawing Sheets

(52) U.S. Cl.
CPC .......... *G06F 9/5022* (2013.01); *G06F 9/5027* (2013.01); *G06F 9/5061* (2013.01); *G06F 9/5077* (2013.01); *G06F 2009/4557* (2013.01); *G06F 2009/45562* (2013.01); *G06F 2009/45575* (2013.01)

(56) References Cited

U.S. PATENT DOCUMENTS

| | | | |
|---|---|---|---|
| 2019/0108049 A1* | 4/2019 | Singh | G06F 9/5055 |
| 2019/0179678 A1* | 6/2019 | Banerjee | G06F 9/5083 |
| 2019/0391841 A1* | 12/2019 | Mullen | G06F 9/485 |
| 2020/0167691 A1* | 5/2020 | Golovin | G06N 3/08 |
| 2021/0034423 A1* | 2/2021 | Hallur | G06F 9/45558 |

* cited by examiner

PAYROLL DATA PROCESSING SERVER

BACKGROUND INFORMATION

1. Field

The present disclosure relates generally to an improved computer system and, in particular, to monitoring and managing batch jobs.

2. Background

Current batch job process servers do not have monitoring and managing capabilities. Once a batch job is triggered, administrators cannot monitor the process in real-time as it executes. The batch processing nodes are not shared. Jobs are queued and triggered in the same node, making reusability difficult.

Batch jobs typically cannot be requested to be executed in a targeted space, since the job servers to not support this feature, thereby making certain jobs more difficult to execute, e.g., jobs that required elevated permission in a specific node. Jobs that require more system resources than other jobs cannot be separated because there is no such configuration available in current job servers.

SUMMARY

An illustrative embodiment provides a computer-implemented method for managing batched jobs. The method comprises receiving a job batch request from a client for a number of processing jobs. Each of the jobs is registered, and jobs that are ready for execution at a specified time are collected from the number of processing jobs. For each of the collected jobs an instance of the job is locked to create a locked job to prevent duplicate execution. The locked jobs are queued, and a container is created for each job in the queue. A method of execution is determined for each job in the queue, and each job in the queue is then executed according the method determined for that job. A number of job events for each executing job are logged, a determination if a job was completed successfully is made according to its respective job events. A job status is updated for each completed job. The container of each completed job is then destroyed, and each completed job is unlocked.

Another illustrative embodiment provides a system for managing batched jobs. The system comprises a storage device configured to store program instructions, and one or more processors operably connected to the storage device and configured to execute the program instructions to cause the system to: receive a job batch request from a client for a number of processing jobs; register each of the jobs; collect jobs from the number of processing jobs that are ready for execution at a specified time; for each job from the collected jobs, lock an instance of the job to create a locked job to prevent duplicate execution; queue the locked jobs; create a container for each job in the queue; determine a method of execution for each job in the queue; execute each job in the queue according the method of execution determined for that job; log a number of job events for each executing job; determine if a job was completed successfully according to its respective job events; update a job status for each completed job; destroy the container of each completed job; and unlock each completed job.

Another illustrative embodiment provides a computer program product for managing batched jobs. The computer program product comprises a computer-readable storage medium having program instructions embodied thereon to perform the steps of: receiving a job batch request from a client for a number of processing jobs; registering each of the jobs; collecting jobs from the number of processing jobs that are ready for execution at a specified time; for each job from the collected jobs, locking an instance of the job to create a locked job to prevent duplicate execution; queuing the locked jobs; creating a container for each job in the queue; determining a method of execution for each job in the queue; executing each job in the queue according the method of execution determined for that job; logging a number of job events for each executing job; determining if a job was completed successfully according to its respective job events; updating a job status for each completed job; destroying the container of each completed job; and unlocking each completed job.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide a job server designed to execute batch jobs and provide features to monitor, support, and maintain the jobs being executed. In addition to triggering and managing batch jobs, the illustrative embodiments also operate as batch as a service (BAAS) that can trigger batch jobs using a web service.

Based on a batch job requirement, a job can be categorized and assigned an operation mode. Example of modes supported by the illustrative embodiments for batch programs include queued execution of batch programs, queued execution of any client node, queued execution at a targeted client node (i.e. required for jobs needing more resources than other jobs), execution by spinning up a dynamic docker container (for long running batch jobs), and batch as a service (BaaS) execution.

In addition to the above modes, the server of the illustrative embodiments also supports scheduling to run specific jobs at specified times. The illustrative embodiments further comprise a dashboard that allows monitoring of batch jobs and displays job level events/log for jobs that use a given utility.

Figure 1:
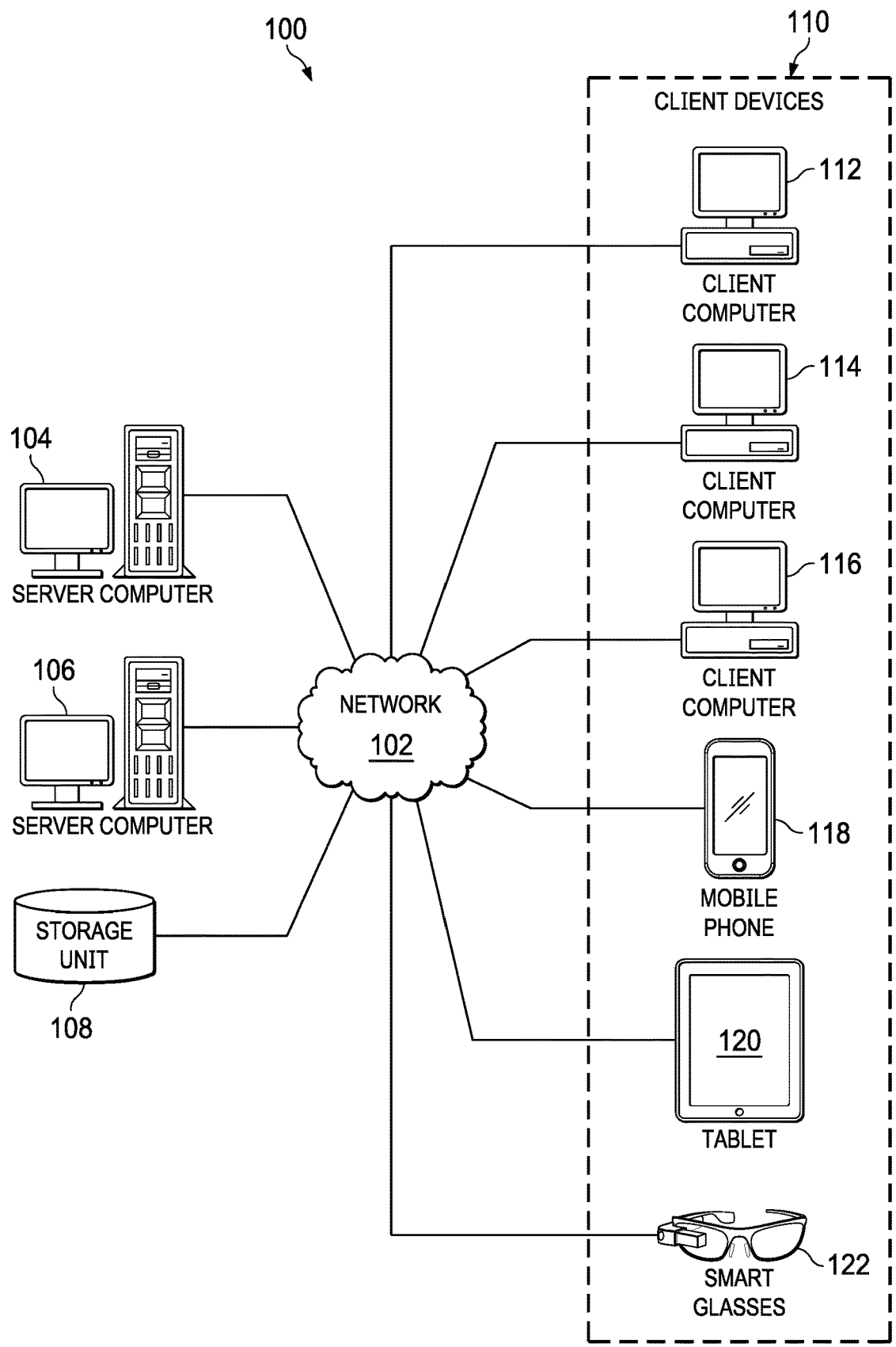
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
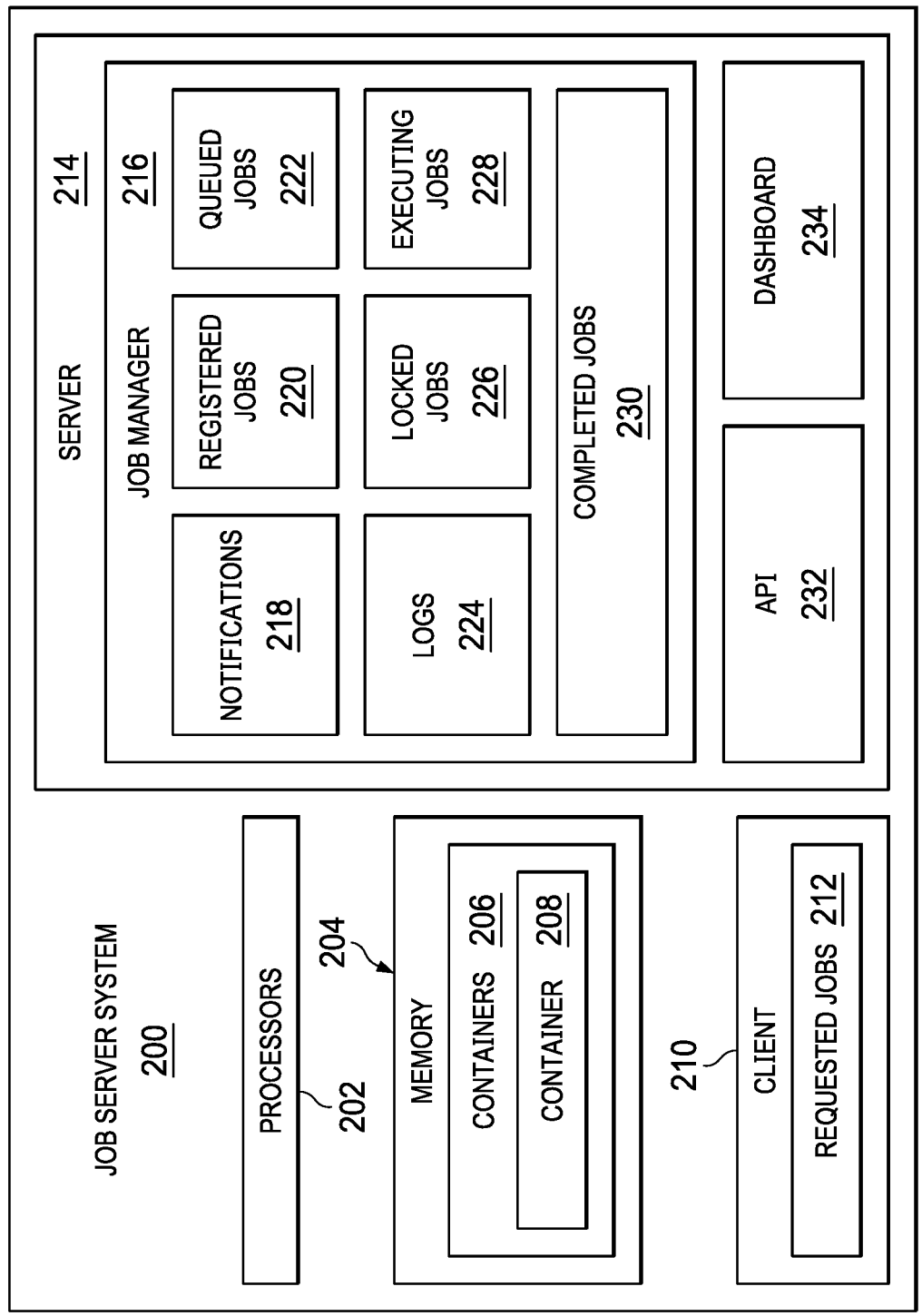
FIG. 2 is an illustration of a block diagram of a job server system in accordance with an illustrative embodiment.

Turning to FIG. 2, a block diagram of a job server system is depicted in accordance with an illustrative embodiment. Job server system 200 might be implemented in network data processing system 100 in FIG. 1.

Job server system 200 comprises a number of processors 202, memory 204, client 210, and server 214.

Memory 204 comprises a number of containers 206. Each container 208 within containers 206 is related to a job execution method selected by the server 214.

Client 210 comprises a number of requested jobs 212 defined by the end user.

Server 214 comprises job manager 216, application programming interfaces (APIs) 232, and dashboard 234.

Job manager 216 tracks the flow of registered jobs 220 submitted to server 214 for processing from the requested jobs 212 defined and submitted by the client 210.

Each registered job 220 changes status as the server 214 executes the job. Jobs might move through a number of possible job statuses comprising including, e.g., registered job 220, queued jobs 222, locked jobs 226, executing jobs 228, and completed jobs 230.

Each executing job 228 generates a number of notifications 218 which are transmitted to job manager 216 and recorded by the job manager 216 in logs 224. Notifications 218 can take the form of notification messages send to job manager 216.

Job server system 200 can be implemented in software, hardware, firmware or a combination thereof. When software is used, the operations performed by job server system 200 can be implemented in program code configured to run on hardware, such as a processor unit. When firmware is used, the operations performed by job server system 200 can be implemented in program code and data and stored in persistent memory to run on a processor unit. When hardware is employed, the hardware may include circuits that operate to perform the operations in job server system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

Figure 3:
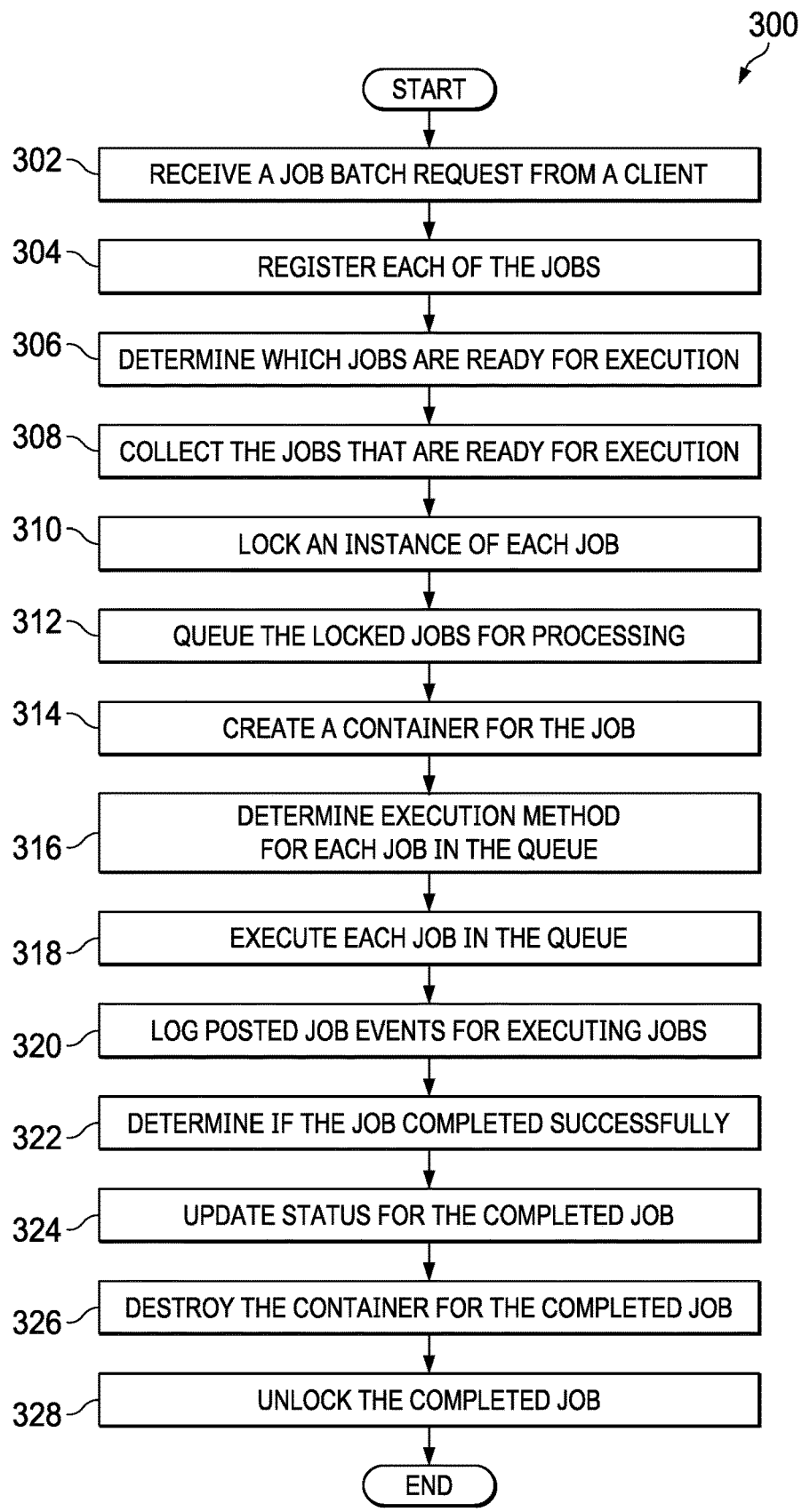
FIG. 3 depicts a flowchart for a process of managing batched jobs in accordance with an illustrative embodiment.

FIG. 3 depicts a flowchart for a process of managing batched jobs in accordance with an illustrative embodiment. The process in FIG. 3 can be implemented in hardware, software, or both. When implemented in software, the process can take the form of program code that is run by one of more processor units located in one or more hardware devices in one or more computer systems. Process 300 might be implemented in job server system 200 shown in FIG. 2.

Process 300 begins by the server receiving a job batch request from a client for a number of processing jobs (step 302). The jobs might be stored in an internal database or an external database. The server then registers each of the jobs for later processing (step 304).

The manager in the server determines if any jobs are ready for execution according to the criteria specified by the user when the job was requested (step 306). The manager in the server collects all jobs that are ready for execution at a specified time (step 308) and locks an instance of each collected job definition to create a locked job to prevent duplicate processing (step 310). The manager places them the collected locked jobs into a processing queue to prepare for execution (step 312).

The server creates a container in memory for each job in the queue as its individual processing space (step 314).

The manager in the server determines a method of execution for each job in the queue (step 316). The manager executes each job in the queue within the respective container according the method of execution determined for that job (step 318).

Each executing job generates a number of notification events which are passed to the manager on the server, which logs the job events for each executing job (step 318). Each executed job might be a parent job or a child job.

The manager on the server reviews the logged events for each job and determines if the job was completed successfully according to its respective job events (step 322). The manager updates a status for each completed job (step 324).

The server destroys the assigned container for each completed job whose status has been updated by the manager (step 326).

The manager unlocks each completed job instance whose assigned container has been destroyed (step 328). Process 300 then ends.

Figure 4:
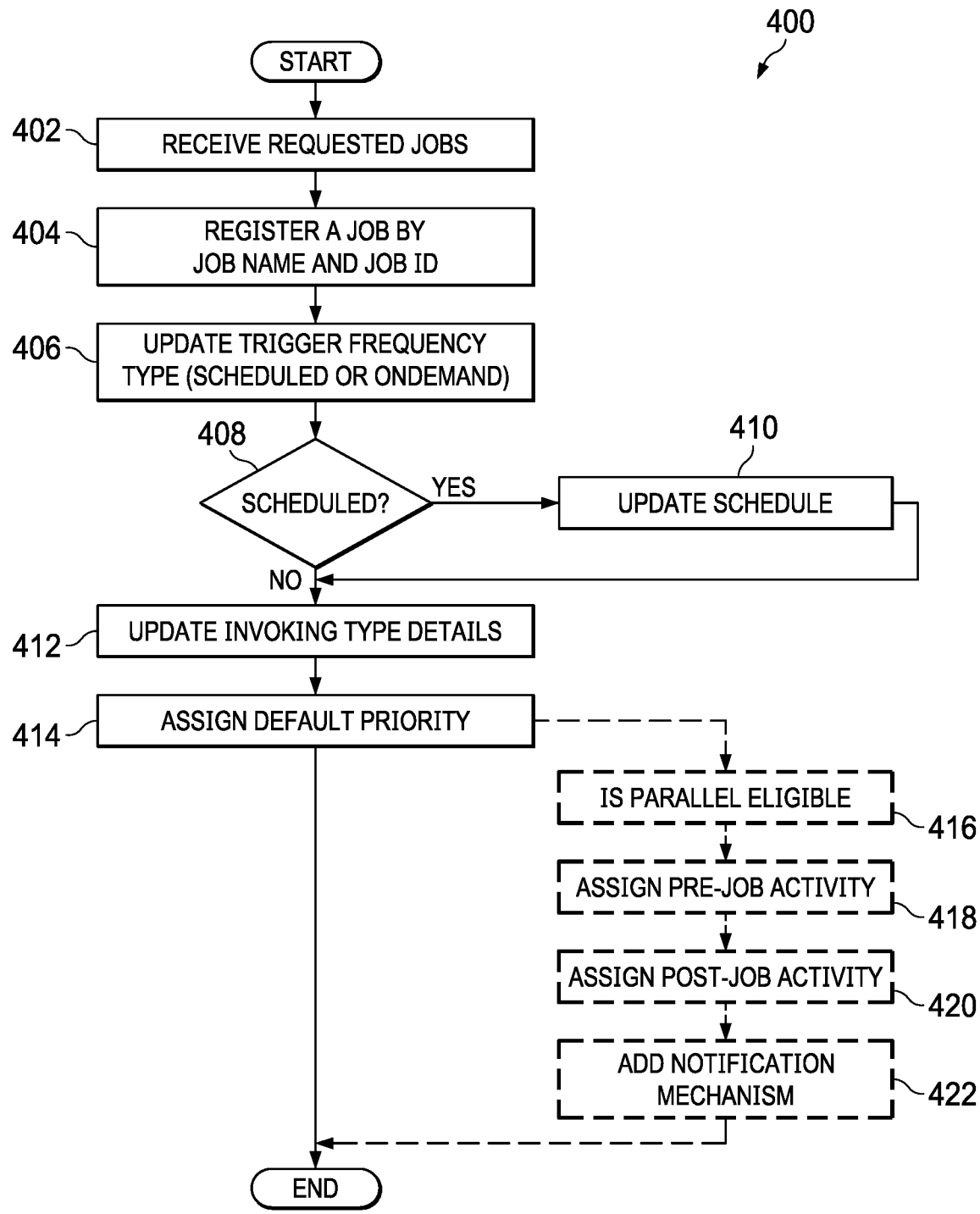
FIG. 4 depicts a flowchart for a process for managing the registration of batch jobs in accordance with an illustrative embodiment.

FIG. 4 depicts a flowchart for a process of managing the registration of batch jobs on the server in accordance with an illustrative embodiment. The process in FIG. 4 can be implemented in hardware, software, or both. When implemented in software, the process can take the form of program code that is run by one of more processor units located in one or more hardware devices in one or more computer systems. Process 400 might be an example of a detailed view of step 304 in FIG. 3.

Process 400 begins by receiving a number of requested jobs from clients and registering each job on the server (step 402). Specifications regarding the frequency, invocation, and priority of the batch job request are registered along with the steps for the job.

The server then registers each incoming job with the server's manager process by storing the job name and job ID for the incoming job (step 404).

The server updates the job's trigger frequency data with the manager by storing the trigger or invocation frequency type (step 406). The invocation frequency type is selected from a list comprising but not limited to at least one of: scheduled or on demand.

The manager then evaluates the invocation frequency type for each of the incoming jobs and determines if the incoming jobs are of the scheduled type (step 408).

For each scheduled type job, the manager updates its schedule with the job name, job id, job trigger date, and job trigger time (step 410).

For all other invocation frequency type jobs, the manager updates the invoking type details for the job by storing the job data for when, where, and how to invoke the job (step 412).

For each incoming job, the manager assigns a priority to the job, based on a defined default job priority list (step 414).

After assigning a default priority to each job, the manager might optionally store the job's execution parameters as provided by the server's registration process. The manager might store if the job can be executed in parallel as indicated by the user (step 416). The manager might then assign all pre-job execution tasks to be done, if any, before each execution of the job (step 418). The manager then assigns all post-job execution tasks to be done, if any, after each execution of the job (step 420). The manager records any special notifications or notification mechanisms requested by the job to be managed at the time of execution (step 422). Process 400 then ends.

Figure 5:
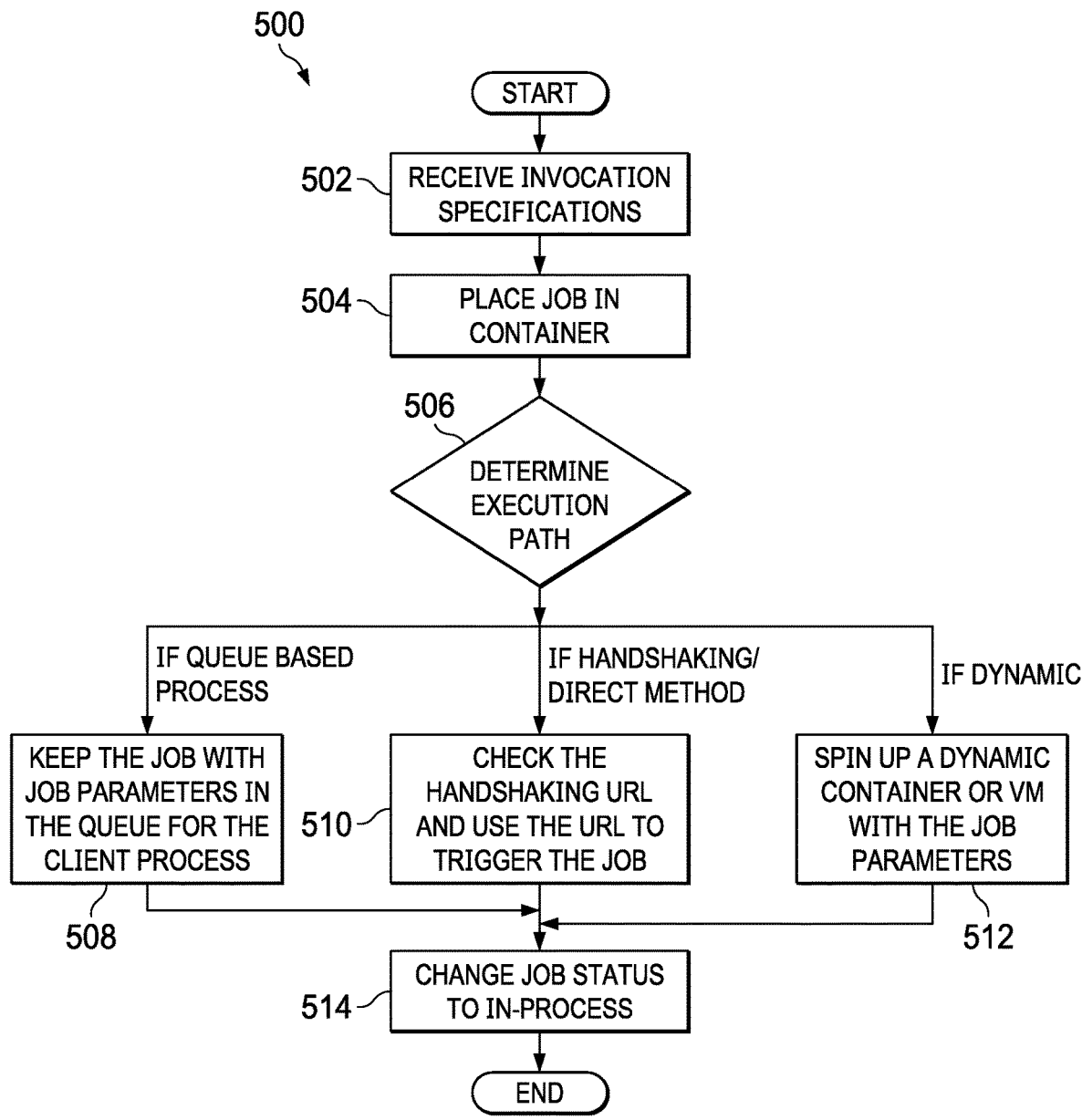
FIG. 5 depicts a flowchart for a process for determining the execution path of batch jobs in accordance with an illustrative embodiment.

FIG. 5 depicts a flowchart for a process of determining the execution path of batch jobs on the server in accordance with an illustrative embodiment. The process in FIG. 5 can be implemented in hardware, software, or both. When implemented in software, the process can take the form of program code that is run by one of more processor units located in one or more hardware devices in one or more computer systems. Process 500 might be an example of a detailed view of step 318 in FIG. 3.

Process 500 begins by receiving the invocation specifications from the manager for the jobs the manager has queued for processing according to step 316 (step 502). The queued job is placed in its assigned container to execute based on the invocation type specified in the job registration with the server (step 504).

The manager determines an execution path based on the invocation type specified for the job (step 506). The method of execution for each collected job might comprise a queue-based job executed on the current server instance, a remote job controlled via a uniform resource locator, or a dynamic job executed in a container or a virtual machine instance.

If the queued job is to be fed to a different processing queue for execution, then the manager places the job into the correct queue with the job's execution parameters (step 508).

If the queued job is to be executed on a remote server by the handshaking or direct method of execution, the manager processes the remote call for execution and monitors the flow of information from the remote system (step 510).

If the queued job is to be executed in a virtual machine or dynamic container, then the manager places the job, according to its parameters into the dynamic container for execution (step 512).

For each executing job, once the execution path is selected and invocation method is executed, the manager changes the status of the job to In-Process (step 514). Process 500 then ends and proceeds to step 320 in FIG. 3.

Figure 6:
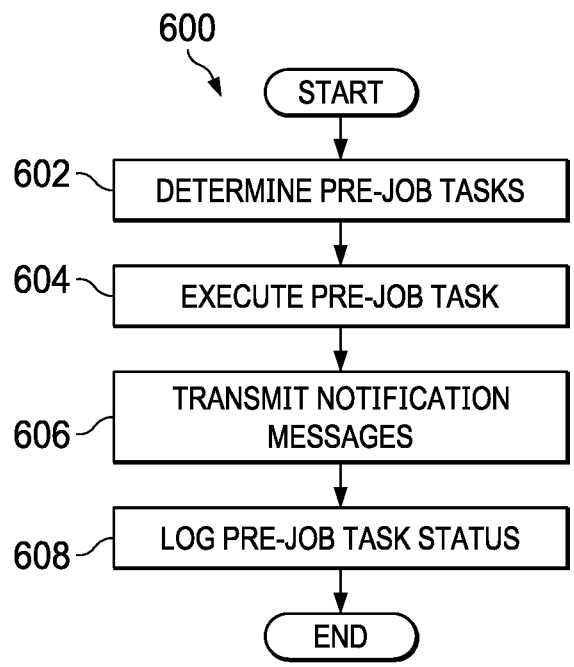
FIG. 6 depicts a flowchart for a process for executing pre-job tasks in accordance with an illustrative embodiment.

FIG. 6 depicts a flowchart for a process of managing pre-job execution tasks on the server in accordance with an illustrative embodiment. The process in FIG. 6 can be implemented in hardware, software, or both. When implemented in software, the process can take the form of program code that is run by one of more processor units located in one or more hardware devices in one or more computer systems. Process 600 might be optionally implemented prior to step 318 in FIG. 3.

Process 600 begins with determining a number of pre-job tasks registered with the server (step 602). Tasks found are executed on the server by the manager in the order provided prior to executing the job (step 604). Each pre-job task might comprise a parallel task or a sequential task.

Any notification events generated by the pre-job tasks are transmitted to a predefined list of recipients (step 606).

Any pre-job task status event notifications received by the manager are logged by the manager as associated with the job and the specific task executed (step 608).

Figure 7:
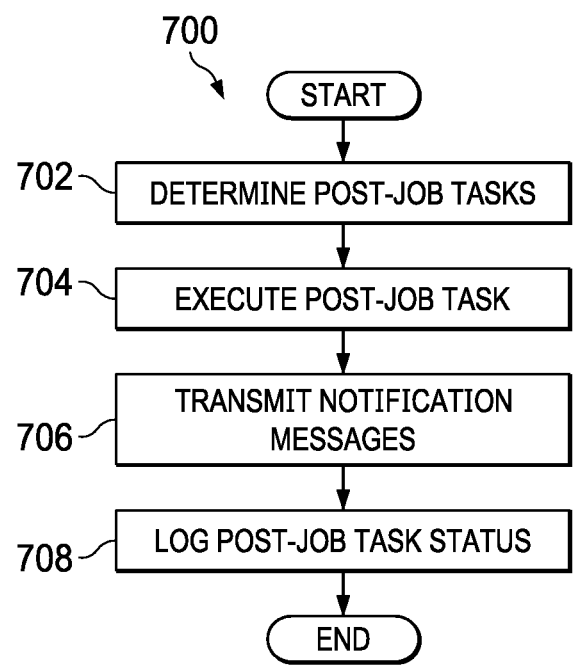
FIG. 7 depicts a flowchart for a process for executing post-job tasks in accordance with an illustrative embodiment.

FIG. 7 depicts a flowchart for a process of managing post-job execution tasks on the server in accordance with an illustrative embodiment. The process in FIG. 7 can be implemented in hardware, software, or both. When implemented in software, the process can take the form of program code that is run by one of more processor units located in one or more hardware devices in one or more computer systems. Process 700 might be optionally implemented after step after step 324 in FIG. 3.

Process 700 begins with determining a number of post-job execution tasks registered with the server (step 702). Tasks found are executed on the server by the manager in the order provided after executing the job (step 704). Each post-job task might comprise a parallel task or a sequential task.

Any notification events generated by the post-job tasks are transmitted to a predefined list of recipients (step 706).

Any post-job task status event notifications received by the manager are logged by the manager as associated with the job and the specific task executed (step 708).

Figure 8:
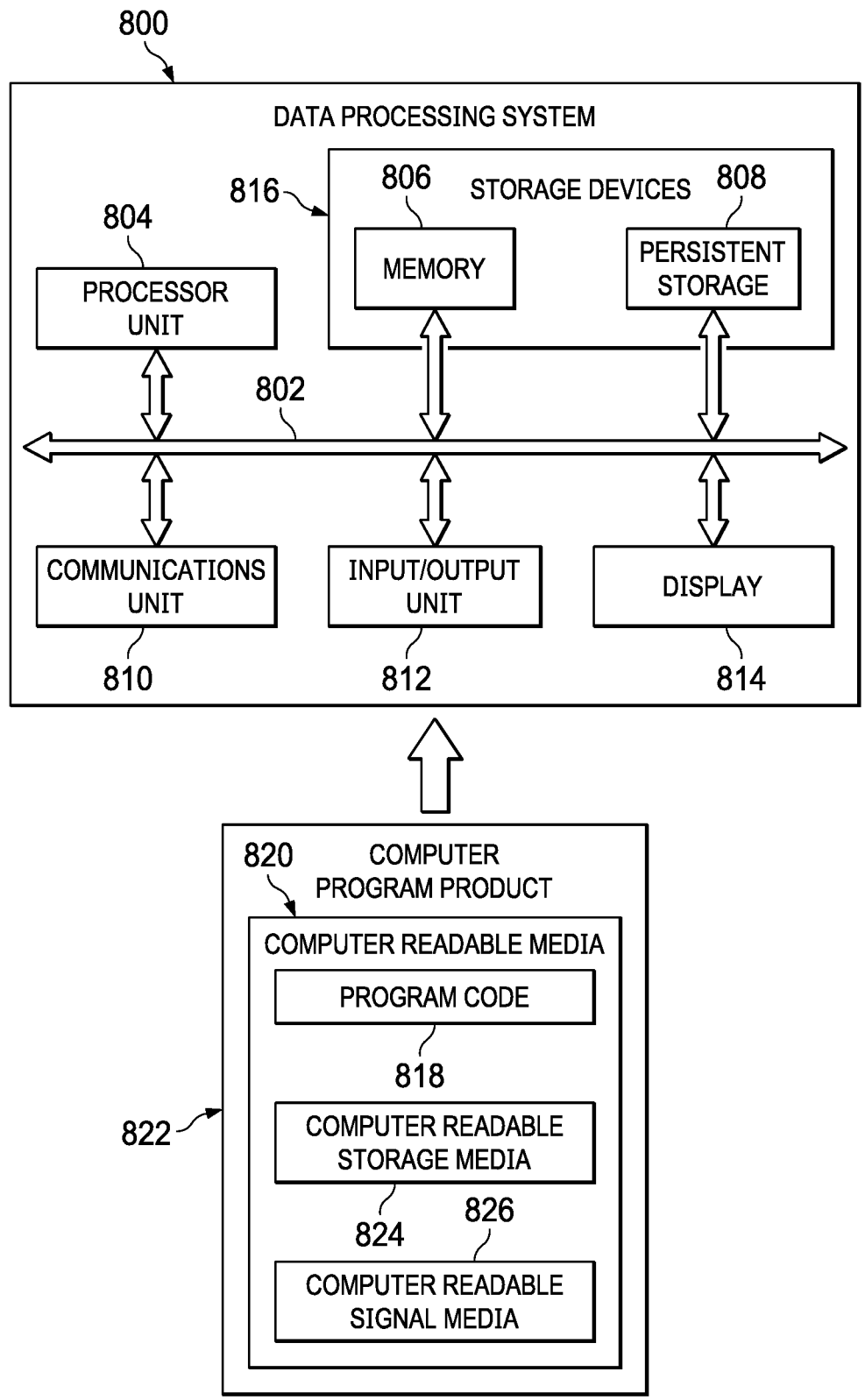
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 1300 may be used to implement one or more computers shown in FIG. 1 (e.g., client devices 110 and server computers 104, 106) and job server system 200 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 816, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of managing batched jobs, the method comprising:
   using a number of processors to perform the steps of:
      receiving a job batch request from a client for a number of processing jobs;
      registering each of the jobs;
      updating job's invocation frequency data of each of the jobs by storing invocation frequency types of the jobs;
      updating schedule and invoking type details for each of the jobs according to each job's invocation frequency type;
      assigning a list of pre-job execution tasks and a list of post-job execution tasks for each of the jobs;
      collecting jobs from the number of processing jobs that are ready for execution at a specified time;
      for each job from the collected jobs, locking an instance of the job to create a locked job to prevent duplicate execution;
      queuing the locked jobs;
      creating a container for each job in the queue;
      determining a method of execution for each job in the queue;
      executing each job in the queue according to the method of execution determined for that job;
      logging a number of job events for each executing job;
      determining if a job was completed successfully according to its respective job events;
      updating a job status for each completed job;
      destroying the container of each completed job; and
      unlocking each completed job.

2. The method of claim 1, wherein each collected job is:
   an on-demand job; or
   a scheduled job.

3. The method of claim 1, wherein the method of execution for each collected job comprises:
   a queue-based job executed on the current server instance;
   a remote job controlled via a uniform resource locator; or
   a dynamic job executed in a container or a virtual machine instance.

4. The method of claim 1, wherein execution of each collected job further comprises:
   executing a number of pre-job tasks that precede execution of the job, wherein the number of pre-job tasks are from the list of pre-job execution tasks;
   transmitting a number of notification messages to a predefined list of recipients; and
   logging a pre-job task status event for each pre-job task executed.

5. The method of claim 1, wherein each executed job is:
a parent job; or
a child job.

6. The method of claim 1, wherein execution of each job further comprises:
executing a number of post-job tasks that succeed execution of the job, wherein the number of post-job tasks are from the list of pre-job execution tasks;
transmitting a number of notification messages to a predefined list of recipients; and
logging a post-job task status event for each post-job task executed.

7. The method of claim 4, wherein each pre-job task of the number of pre-job tasks comprises:
a parallel task; or
a sequential task.

8. The method of claim 6, wherein each post-job task of the number of post-job tasks comprises:
a parallel task; or
a sequential task.

9. The method of claim 1, wherein the jobs are stored in:
an internal database; or
an external database.

10. The method of claim 1, further comprising assigning a priority level to each collected job.

11. A system for managing batched jobs, the system comprising:
a storage device configured to store program instructions; and
one or more processors operably connected to the storage device and configured to execute the program instructions to cause the system to:
receive a job batch request from a client for a number of processing jobs;
register each of the jobs;
update job's invocation frequency data of each of the jobs by storing invocation frequency types of the jobs;
update schedule and invoking type details for each of the jobs according to each job's invocation frequency type;
assign a list of pre-job execution tasks and a list of post-job execution tasks for each of the jobs;
collect jobs from the number of processing jobs that are ready for execution at a specified time;
for each job from the collected jobs, lock an instance of the job to create a locked job to prevent duplicate execution;
queue the locked jobs;
create a container for each job in the queue;
determine a method of execution for each job in the queue;
execute each job in the queue according to the method of execution determined for that job;
log a number of job events for each executing job;
determine if a job was completed successfully according to its respective job events;
update a job status for each completed job;
destroy the container of each completed job; and
unlock each completed job.

12. The system of claim 11, wherein each collected job is:
an on-demand job; or
a scheduled job.

13. The system of claim 11, wherein the method of execution for each collected job comprises:
a queue-based job executed on the current server instance;
a remote job controlled via a uniform resource locator; or
a dynamic job executed in a container or a virtual machine instance.

14. The system of claim 11, wherein execution of each collected job further comprises:
executing a number of pre-job tasks that precede execution of the job, wherein the number of pre-job tasks are from the list of pre-job execution tasks;
transmitting a number of notification messages to a predefined list of recipients; and
logging a pre-job task status event for each pre-job task executed.

15. The system of claim 11, wherein each executed job is:
a parent job; or
a child job.

16. The system of claim 11, wherein execution of each job further comprises:
executing a number of post-job tasks that succeed execution of the job from the list of post-job execution tasks;
transmitting a number of notification messages to a predefined list of recipients; and
logging a post-job task status event for each post-job task executed.

17. The system of claim 14, wherein each pre-job task of the number of pre-job tasks comprises:
a parallel task; or
a sequential task.

18. The system of claim 16, wherein each post-job task of the number of post-job tasks comprises:
a parallel task; or
a sequential task.

19. The system of claim 11, wherein the jobs are stored in:
an internal database; or
an external database.

20. The system of claim 11, wherein the processors further execute instructions to assign a priority level to each collected job.

21. A computer program product for managing batched jobs, the computer program product comprising:
a computer-readable storage medium having program instructions embodied thereon to perform the steps of:
receiving a job batch request from a client for a number of processing jobs;
registering each of the jobs;
updating job's invocation frequency data of each of the jobs by storing invocation frequency types of the jobs;
updating schedule and invoking type details for each of the jobs according to each job's invocation frequency type;
assigning a list of pre-job execution tasks and a list of post-job execution tasks for each of the jobs;
collecting jobs from the number of processing jobs that are ready for execution at a specified time;
for each job from the collected jobs, locking an instance of the job to create a locked job to prevent duplicate execution;
queuing the locked jobs;
creating a container for each job in the queue;
determining a method of execution for each job in the queue;
executing each job in the queue according to the method of execution determined for that job;
logging a number of job events for each executing job;
determining if a job was completed successfully according to its respective job events;
updating a job status for each completed job;
destroying the container of each completed job; and
unlocking each completed job.

22. The computer program product of claim 21, wherein each collected job is:
- an on-demand job; or
- a scheduled job.

23. The computer program product of claim 21, wherein the method of execution for each collected job comprises:
- a queue-based job executed on the current server instance;
- a remote job controlled via a uniform resource locator; or
- a dynamic job executed in a container or a virtual machine instance.

24. The computer program product of claim 21, wherein execution of each collected job further comprises instructions for:
- executing a number of pre-job tasks that precede execution of the job from the list of pre-job execution tasks;
- transmitting a number of notification messages to a predefined list of recipients; and
- logging a pre-job task status event for each pre-job task executed.

25. The computer program product of claim 21, wherein each executed job is:
- a parent job; or
- a child job.

26. The computer program product of claim 21, wherein execution of each job further comprises instructions for:
- executing a number of post-job tasks that succeed execution of the job from the list of post-job execution tasks;
- transmitting a number of notification messages to a predefined list of recipients; and
- logging a post-job task status event for each post-job task executed.

27. The computer program product of claim 24, wherein each pre-job task of the number of pre-job tasks comprises:
- a parallel task; or
- a sequential task.

28. The computer program product of claim 26, wherein each post-job task of the number of post-job tasks comprises:
- a parallel task; or
- a sequential task.

29. The computer program product of claim 21, wherein the jobs are stored in:
- an internal database; or
- an external database.

30. The computer program product of claim 21, further comprising instructions assigning a priority level to each collected job.

* * * * *